(12) United States Patent
Oyman

(10) Patent No.: US 8,793,743 B2
(45) Date of Patent: Jul. 29, 2014

(54) MULTICAST BROADCAST MULTIMEDIA SERVICE-ASSISTED CONTENT DISTRIBUTION

(71) Applicant: Intel Corporation, Santa Clara, CA (US)

(72) Inventor: Ozgur Oyman, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/626,661

(22) Filed: Sep. 25, 2012

(65) Prior Publication Data

US 2013/0247118 A1    Sep. 19, 2013

Related U.S. Application Data

(60) Provisional application No. 61/612,188, filed on Mar. 16, 2012.

(51) Int. Cl.
| | |
|---|---|
| *H04N 7/16* | (2011.01) |
| *H04N 7/173* | (2011.01) |
| *H04N 21/258* | (2011.01) |
| *H04N 21/414* | (2011.01) |
| *H04N 21/6405* | (2011.01) |
| *H04N 21/6408* | (2011.01) |
| *H04W 4/06* | (2009.01) |

(52) U.S. Cl.
CPC ... *H04N 21/25841* (2013.01); *H04N 21/41407* (2013.01); *H04N 21/6405* (2013.01); *H04N 21/6408* (2013.01); *H04W 4/06* (2013.01)
USPC ............. 725/62; 725/114; 725/116; 725/118; 725/119

(58) Field of Classification Search
CPC ................ H04W 21/25841; H04W 21/41407; H04W 21/6405; H04W 21/6408
See application file for complete search history.

(56) References Cited

U.S. PATENT DOCUMENTS

| | | |
|---|---|---|
| 2005/0125533 A1 | 6/2005 | Svanbro et al. |
| 2006/0253544 A1 | 11/2006 | Luoma et al. |

(Continued)

FOREIGN PATENT DOCUMENTS

WO    2008129471 A2    10/2008

OTHER PUBLICATIONS

3GPP, "Technical Specification Group Services and System Aspects; Transparent end-to-end Packet-switched Streaming Service (PSS); Progressive Download and Dynamic Adaptive Streaming over HTTP (3GP-DASH); (Release 10)," 3GPP TS 26.247 V10.1.0; Lte Advanced; Dec. 21, 2011; 93 pages.

(Continued)

*Primary Examiner* — Mark D Featherstone
(74) *Attorney, Agent, or Firm* — Schwabe, Williamson & Wyatt, P.C.

(57) ABSTRACT

Embodiments provide methods, systems, and apparatuses for multicast broadcast multimedia service (MBMS)-assisted content distribution in a wireless communication network. A proxy terminal may include an MBMS access client configured to receive and cache an MBMS transmission including media data and metadata. The proxy terminal may further include a hypertext transfer protocol (HTTP) server module configured to transmit at least a portion of the media data to a user equipment (UE) of the wireless communication network via an HTTP transmission. The media data and metadata may be in a dynamic adaptive streaming over HTTP (DASH) format. The proxy terminal may be included in an evolved Node B (eNB), the UE, or another UE of the wireless communication network.

30 Claims, 5 Drawing Sheets

(56) References Cited

U.S. PATENT DOCUMENTS

| | | | |
|---|---|---|---|
| 2008/0049789 A1* | 2/2008 | Vedantham et al. | 370/474 |
| 2008/0242290 A1 | 10/2008 | Bhatia et al. | |
| 2010/0299702 A1 | 11/2010 | Lo et al. | |
| 2013/0007814 A1* | 1/2013 | Cherian et al. | 725/62 |

OTHER PUBLICATIONS

3GPP, "Technical Specification Group Services and System Aspects; Multimedia Broadcast/Multicast Service (MBMS); Protocols and codecs; (Release 10)," 3GPP TS 26.346 V10.2.0; Lte Advanced; Dec. 21, 2011; 152 pages.

International Search Report and Written Opinion for International Application No. PCT/US2013/026603, mailed Jun. 3, 2013.

* cited by examiner

MULTICAST BROADCAST MULTIMEDIA SERVICE-ASSISTED CONTENT DISTRIBUTION

CROSS REFERENCE TO RELATED APPLICATIONS

The present application claims priority to U.S. Provisional Patent Application No. 61/612,188, filed Mar. 16, 2012, entitled "WIRELESS COMMUNICATION SYSTEMS AND METHODS," the entire disclosure of which is hereby incorporated by reference.

FIELD

Embodiments of the present invention relate generally to the field of communications, and more particularly, to multicast broadcast multimedia service-assisted content distribution.

BACKGROUND

In some wireless communication networks, dynamic adaptive streaming over hypertext transfer protocol (DASH) streaming format is used to deliver media content, such as video, audio, multimedia, and/or other content to a user equipment (UE) over a wireless communication network. DASH has been standardized in Third Generation Partnership Project (3GPP) TS 26.247 V.10.2.0 as well as ISO/IEC DIS 23009-1 in MPEG. The media content is typically accessed by the UE via unicast HTTP signaling between the UE and a remote HTTP media server that stores the media content. The UE sends an HTTP request that is routed to the remote HTTP media server, and the remote HTTP media server transmits the requested media content to the UE via HTTP in response. This may create high signaling overhead in the network and add delay to the distribution of the media content.

In DASH, a media presentation description (MPD) metadata file provides information on the structure and different versions of the media content representations stored in the server (including different bitrates, frame rates, resolutions, codec types, etc.). In addition, DASH also specifies the segment formats, e.g., includes information on the initialization and media segments for a media player (the media player looks at initialization segment to understand container format and media timing info) to ensure mapping of segments into a media presentation timeline for switching and synchronous presentation with other representations. Based on this MPD metadata information that describes the relation of the segments and how they form a media presentation, clients may request the segments using HTTP GET or partial GET methods.

Multimedia Broadcast Multicast Services (MBMS) specified in 3GPP TS 26.346 is a point-to-multipoint system utilized on cellular networks operating in accordance with one of the cellular standards promulgated by the 3GPP. It is designed for efficient delivery of popular content to many receivers based on broadcast and multicast techniques and was first introduced in release six of the 3GPP Universal Mobile Telecommunications System (UMTS) specification as an optional feature. MBMS was further optimized in the later 3GPP releases based on several enhancements such as multicast broadcast single frequency network (MBSFN) functionality. At the service layer, MBMS also defines delivery protocols for both streaming of multimedia content and reliable download of files, based on the transport-layer protocol based on the user datagram protocol (UDP), using real-time transmission protocol (RTP) for streaming and File Delivery over Unidirectional Transport (FLUTE) for file delivery. MBMS has been adopted as the enhanced MBMS (eMBMS) mode in 3GPP-based Long Term Evolution (LTE) standards development corresponding to 3GPP releases eight and onwards.

DASH-formatted content could be delivered to the UE using both MBMS download delivery methods and/or HTTP-based delivery methods. MBMS-based DASH delivery option may not be available in some service areas, in which case those services might be alternatively provided via unicast. In case of DASH-formatted content delivery over MBMS, FLUTE transport protocol may be used. FLUTE as defined in RFC3926 permits to deliver DASH segments over MBMS such that the client observes them being delivered over HTTP/TCP. HTTP-URL is assigned to each delivered object in FLUTE and the HTTP-URL maps the Segment URLs in the MPD. The UE would identify the received DASH representations based on the comparison of the HTTP URLs contained in the MPD and the URL information included in the FLUTE packets.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, and apparatuses for multicast broadcast multimedia service-assisted content distribution.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
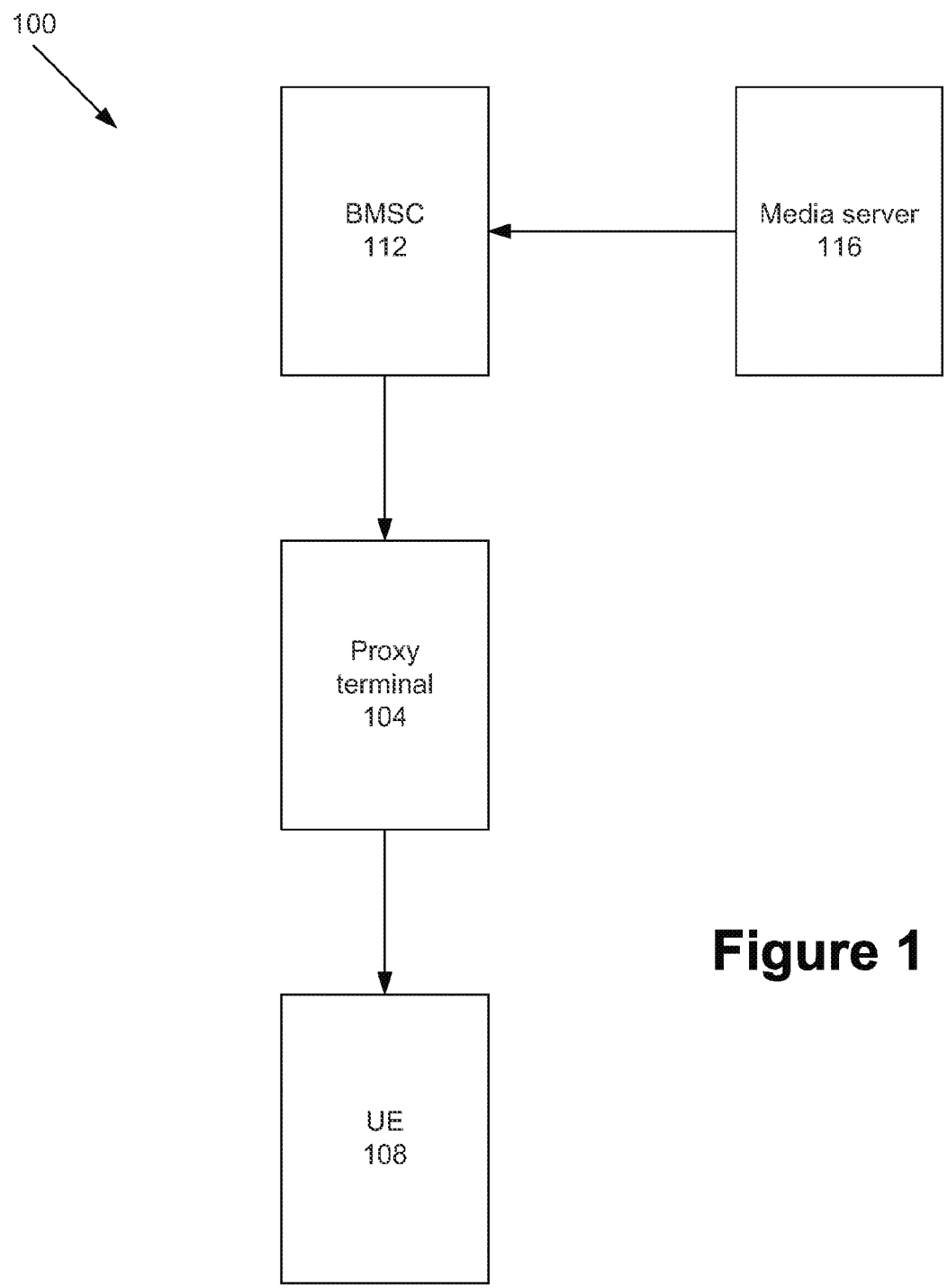
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMTS) terrestrial radio access network (E-UTRAN). The network 100 may include a proxy terminal 104 configured to communicate with a user equipment (UE) 108 via a wireless or wired connection. The network 100 may further include a broadcast multicast service center (BMSC) 112 that delivers the MBMS services to various MBMS clients and a media server 116 that stores and distributes media content.

In some embodiments, the proxy terminal 104 may be a base station, e.g., an evolved Node B (eNB) configured to wirelessly communicate with the UE 108 over network 100. In other embodiments, the proxy terminal 104 may be another UE. In embodiments in which the proxy terminal 104 is another UE, the other UE may communicate with the BMSC 112 and/or other components of network 100 via an eNB. The other UE may operate as a "hot spot" to allow the UE 108 to access the network 100. In yet other embodiments, the proxy terminal 104 may be included in the UE 108, i.e., the functionalities of the proxy terminal 104 and those of the UE 108 may be hosted in a single terminal.

Figure 2:
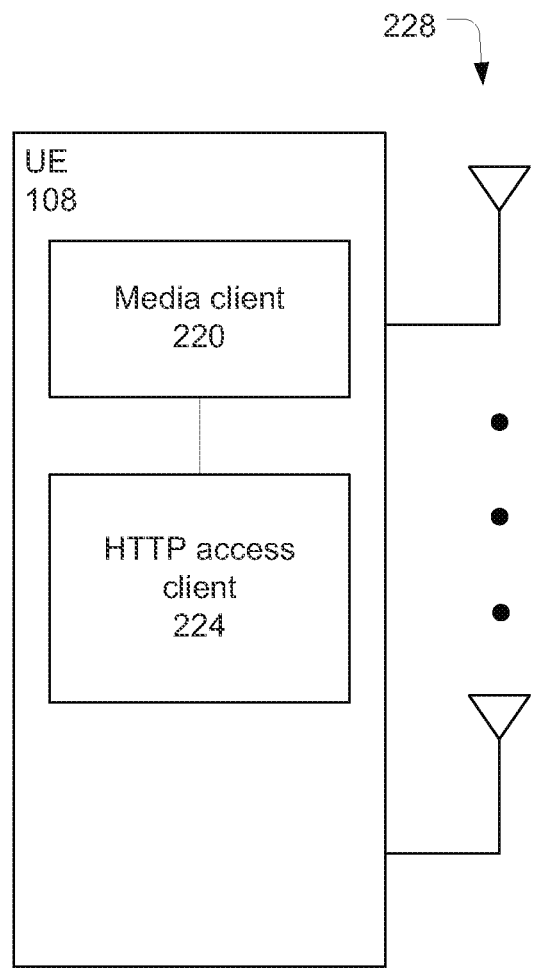
FIG. 2 is a block diagram of a user equipment in accordance with various embodiments.

As shown in FIG. 2, the UE 108 may include a media client 220 and a hypertext transfer protocol (HTTP) access client 224 coupled to one another at least as shown. The HTTP access client 224 may be further coupled with one or more of a plurality of antennas 228 of the UE 108 for communicating wirelessly over network 100. The UE 108 may include any suitable number of antennas 228. One or more of the antennas 228 may be alternately used as transmit or receive antennas. Alternatively, or additionally, one or more of the antennas 228 may be dedicated receive antennas or dedicated transmit antennas.

Figure 3:
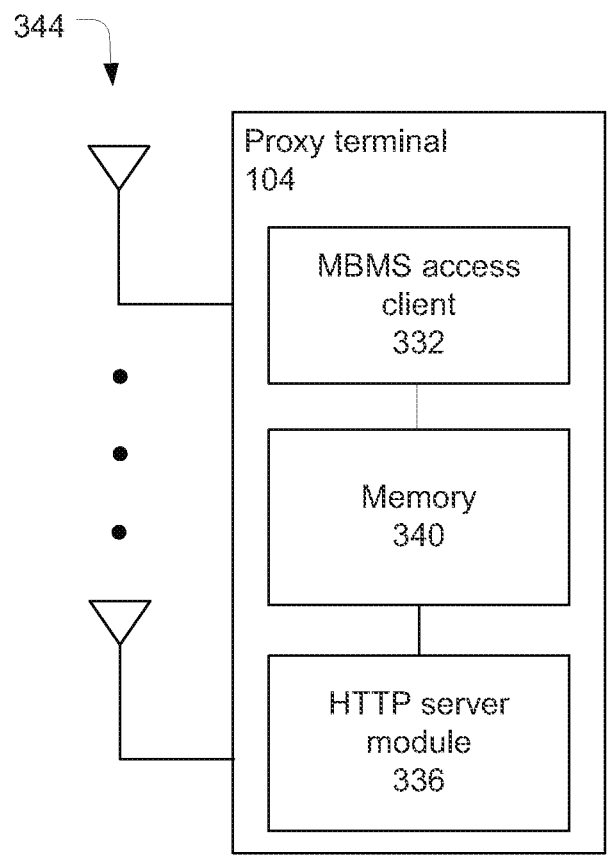
FIG. 3 is a block diagram of a proxy terminal in accordance with various embodiments.

As shown in FIG. 3, proxy terminal 104 may include a multimedia broadcast multicast service (MBMS) access client 332, an HTTP server module 336, and a memory 340 coupled to one another at least as shown. The MBMS access client 332 and/or HTTP server module 336 may be further coupled with one or more antennas 344 of the proxy terminal 104. In various embodiments, the proxy terminal 104 may include at least as many antennas 344 as a number of simultaneous transmission streams transmitted to the UE 108 and/or received from the BMSC 112, although the scope of the present disclosure may not be limited in this respect. One or more of the antennas 344 may be alternately used as transmit or receive antennas. Alternatively, or additionally, one or more of the antennas 344 may be dedicated receive antennas or dedicated transmit antennas.

In various embodiments, the MBMS access client 332 of the proxy terminal 104 may receive an MBMS transmission including media data and metadata. The proxy terminal 104 may cache the media data and/or metadata (e.g., store the media data and/or metadata in memory 340) for later transmission to the UE 108. The MBMS access client 332 may receive the MBMS transmission wirelessly from the BMSC 112. For example, the MBMS access client 332 may receive the MBMS transmission via file delivery over a unidirectional transport (FLUTE) protocol and/or an internet protocol (IP) multicast protocol. In various embodiments, the MBMS access client 332 may receive the media data and metadata from the BMSC 112 via user service discovery (USD) signaling. In some embodiments, the MBMS transmission may include dynamic adaptive streaming over HTTP (DASH) formatted media content and associated MPD metadata. The BMSC 112 may transmit the MBMS transmission to a plurality of proxy terminals including the proxy terminal 104. In the case of DASH formatted media content, the HTTP access client 224 of the UE 108 may also be referred to as a DASH client.

The BMSC 112 may receive the media data and/or metadata from the media server 116. In some embodiments, the BMSC 112 may retrieve the media data and metadata from the media server 116 via HTTP signaling. The communication link between the BMSC 112 and the media server 116 may be wireless and/or wired.

In various embodiments, the HTTP server module 336 of the proxy terminal 104 may transmit at least a portion of the media data and metadata to the UE 108 via an HTTP transmission. In some embodiments the HTTP access client 224 in the UE 108 may receive at least a portion of the media data and metadata from the HTTP server module 336 of the proxy terminal 104 by issuing HTTP GET or HTTP partial GET requests. Accordingly, the MBMS transmission may be used to efficiently distribute the media data and/or metadata to a plurality of proxy terminals. The proxy terminals may then distribute the media data and/or metadata to associated UEs via HTTP.

In some embodiments, the media data and metadata may be in a DASH format. For example, the media data may include a plurality of media segments associated with a media presentation, such as a video, audio, and/or multimedia presentation. The media segments may be associated with different periods of the media presentation and/or be different versions of the same period of the media presentation. The versions may include different properties, such as bit rate, frame rate, resolution, codec type, and/or other properties.

The metadata for DASH-formatted content may include a media presentation description (MPD) metadata associated with the media data. The MPD metadata may include information related to the content and/or properties of the media segments included in the media data, and/or parameters associated with the MBMS transmission that includes the media data.

In various embodiments, the media client 220 of the UE 108 may also request one or more media segments from the BMSC 112 or media server 116, using HTTP requests (e.g., via the HTTP access client 224), based on the MPD metadata. The media client 220 may request media segments of successive periods to present the media presentation to a user of the UE 108. The media client 220 may dynamically change which media segment version to request based on one or more conditions, such as available bandwidth, network conditions, user preferences, device capabilities (e.g., display resolution, processing capabilities, memory resources, etc.), and/or device conditions (e.g., other processing/memory overhead).

In various embodiments, the HTTP server module 336 of the proxy terminal 104 may receive the HTTP request from the HTTP access client 224 of the UE 108. The HTTP server module 336 may transmit the requested media segment to the UE 108 via HTTP in response to the request.

In conventional systems, the HTTP request by the UE 108 is forwarded to remote HTTP servers through one or more intermediary devices (e.g., an eNB, HTTP cache, etc.). In contrast, the proxy terminal 104 discussed herein responds directly to the HTTP request by the UE 108. The HTTP request may not be forwarded to the media server 116. Accordingly, the proxy terminal 104 may provide reduced signaling over network 100 and/or reduced delay (e.g., startup delay) for UE 108 to access the media presentation. Additionally, the MBMS-assisted process described herein may be transparent to the UE 108.

Although the media data and metadata is described herein with reference to DASH-formatted media data and metadata, the present disclosure is not limited in this respect. In other embodiments, the proxy terminal 104 may be used to distribute any suitable type of media data and/or metadata to UE 108.

In some embodiments, the proxy terminal 104 may receive and/or cache only a portion (e.g., selected media segments) of the media data for a given media presentation that is available from the BMSC. The proxy terminal 104 may receive a first MPD metadata from the BMSC 112 associated with the media data that is available from the BMSC 112. The proxy terminal 104 may generate and/or transmit to the UE 108 a second MPD metadata associated with a subset or superset of the media data that is available for HTTP transmission to the UE. The proxy terminal 104 may receive and/or cache only a portion of the media data, for example, due to scheduling restraints, memory restraints, network conditions, and/or to allow memory/bandwidth for other media presentations.

In some embodiments, the proxy terminal 104 may cache a subset of available media segments corresponding to a subset of the representations (e.g., quality levels) for a given portion of the media presentation.

In some embodiments, the proxy terminal 104 may cache a subset of available media segments that corresponds to a beginning portion of the media presentation. This may facilitate fast startup of the media presentation when playback of the media presentation is requested by the user. Additional media segments may be requested after playback is requested.

The media presentations and/or media segments cached by the proxy terminal 104 may be selected based on any suitable criteria, such as a determined or anticipated popularity of the media presentation and/or media segment. In some embodiments, a media presentation may be selected based on a user indication that identifies the media presentation (e.g., indicating that the user wishes to playback the media presentation when it becomes available and/or at a later time). This may be particularly helpful in embodiments in which the proxy terminal 104 is included in the UE 108, although it is not limited in that regard. In some embodiments, the UE 108 may also indicate one or more capabilities of the UE 108 and/or quality/experience preferences of the user to facilitate selection of one or more suitable representations of the media presentation. For example, the user may prefer a lower bitrate presentation with less playback delay compared with a higher bitrate presentation.

In various embodiments, the MBMS access client 332 of the proxy terminal 104 may include one or more MBMS capabilities to receive and/or cache the MBMS transmission. For example, the MBMS access client 332 may activate MBMS service with the BMSC 112 and receive the MPD metadata via USD signaling. In some embodiments, the MBMS access client 332 may decode an application layer forward error correction (AL-FEC) code, such as a Raptor code, associated with the MBMS transmission. Additionally, or alternatively, the MBMS access client 332 may perform one or more recovery procedures to retrieve incorrectly received portions of the media data and/or metadata. In some embodiments, the MBMS access client 332 may send a report to the BMSC 112 with delivery verification information and/or reception statistics.

As discussed above, in some embodiments, the proxy terminal 104 may be included in an eNB or another UE of network 100. The UE 108 may have a communications link with the eNB or other UE to transmit and/or receive other data, in addition to the media data and metadata, over the network 100. In other embodiments, the proxy terminal 104 may be included in the UE 108, i.e., functionalities of the proxy terminal 104 and those of the UE 108 may be hosted in a single terminal. In these embodiments, the HTTP server module 336 may have a wired or wireless connection with the HTTP access client 224 of the UE 108.

Figure 4:
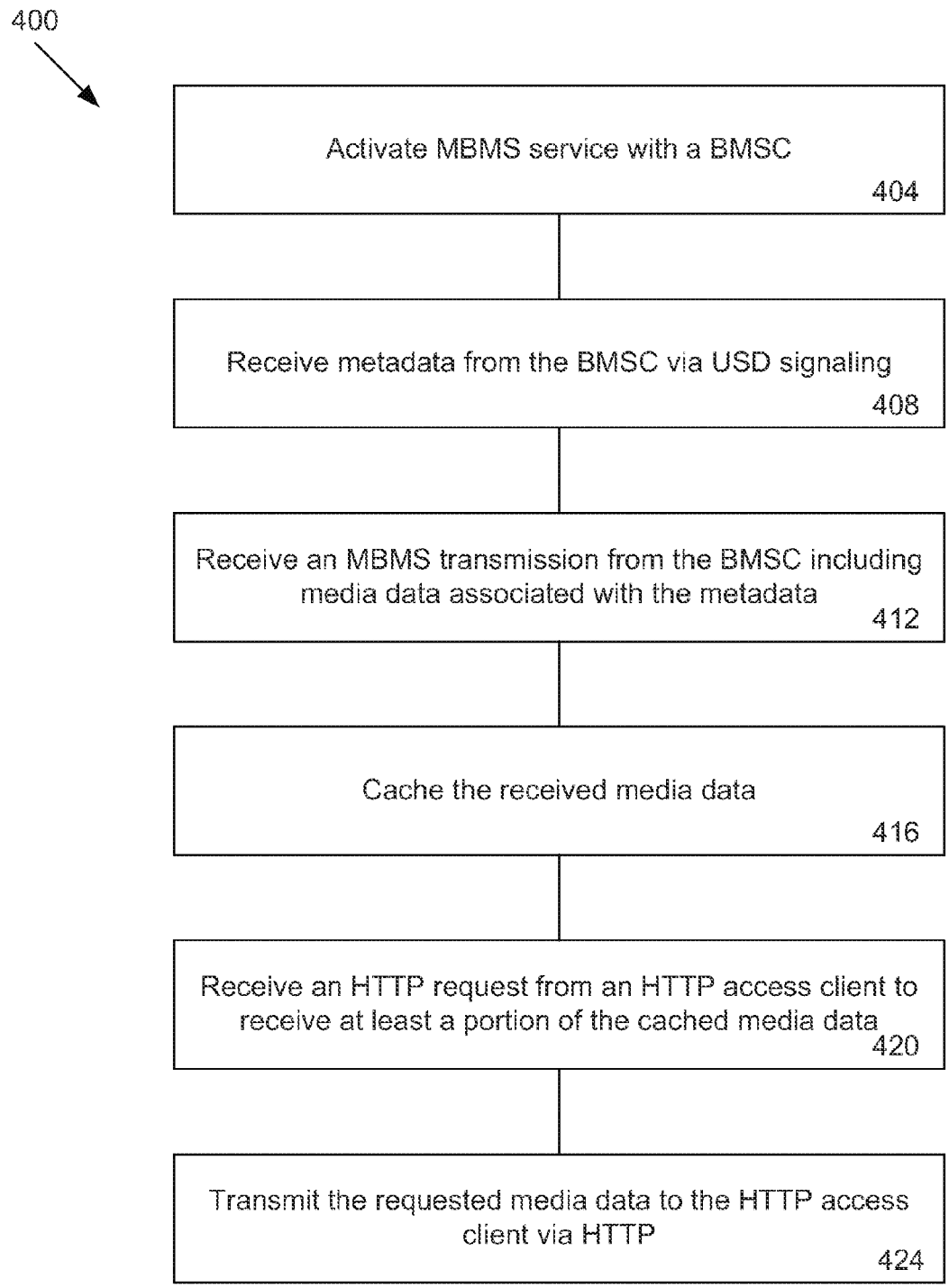
FIG. 4 is a flowchart illustrating a method of facilitating distribution of media data to a UE that may be performed by a proxy terminal in accordance with various embodiments.

FIG. 4 illustrates a method 400 of facilitating distribution of media data to an HTTP access client of a UE (e.g., HTTP access client 224 of UE 108) in accordance with various embodiments. Method 400 may be performed by a proxy terminal (e.g., proxy terminal 104). The proxy terminal may be, for example, included in an eNB or another UE. Alternatively, the proxy terminal may be included in the same UE terminal that includes the HTTP access client. In some embodiments, the proxy terminal may include and/or have access to one or more computer-readable media having instructions stored thereon, that, when executed, cause the proxy terminal to perform the method 400.

At 404, the proxy terminal may activate MBMS service with a BMSC (e.g., BMSC 112). The proxy terminal may activate the MBMS service proactively, e.g., not in response to instructions from the UE.

At 408, the proxy terminal may receive metadata (e.g., MPD metadata) from the BMSC via USD signaling. The metadata may be associated with media data that will be broadcasted by the BMSC. The metadata may be passed on to the UE. In some embodiments, the metadata may be modified before being passed on to the UE. For example, the metadata may be modified to include information related to a subset or superset of the media data that is available for HTTP transmission to the UE.

At 412, the proxy terminal may receive an MBMS transmission from the BMSC that includes the media data. The media data may be in a DASH format and include a plurality of media segments associated with a media presentation.

At 416, the proxy terminal may cache the received media data. The caching may include storing the media data in local storage on the proxy terminal.

At 420, the proxy terminal may receive an HTTP request from an HTTP access client to receive at least a portion of the cached media data. For example, the HTTP request may identify one or more media segments of the cached media data. The HTTP access client may be hosted in the UE 108. In some embodiments, the MBMS access client, memory, HTTP server and HTTP access client functionalities may be hosted in a single terminal. In other embodiments, the MBMS access client, memory, and HTTP server may be hosted in another terminal, such as an eNB or another UE.

At 424, the proxy terminal may transmit the requested media data to the HTTP access client via HTTP signaling. The proxy terminal may retrieve the requested media data from local storage for transmission. Accordingly, the HTTP request from the HTTP access client may be intercepted by the proxy terminal and not forwarded to a remote server.

The proxy terminal may thereafter receive additional HTTP requests from the UE to retrieve other portions of the media data.

Figure 5:
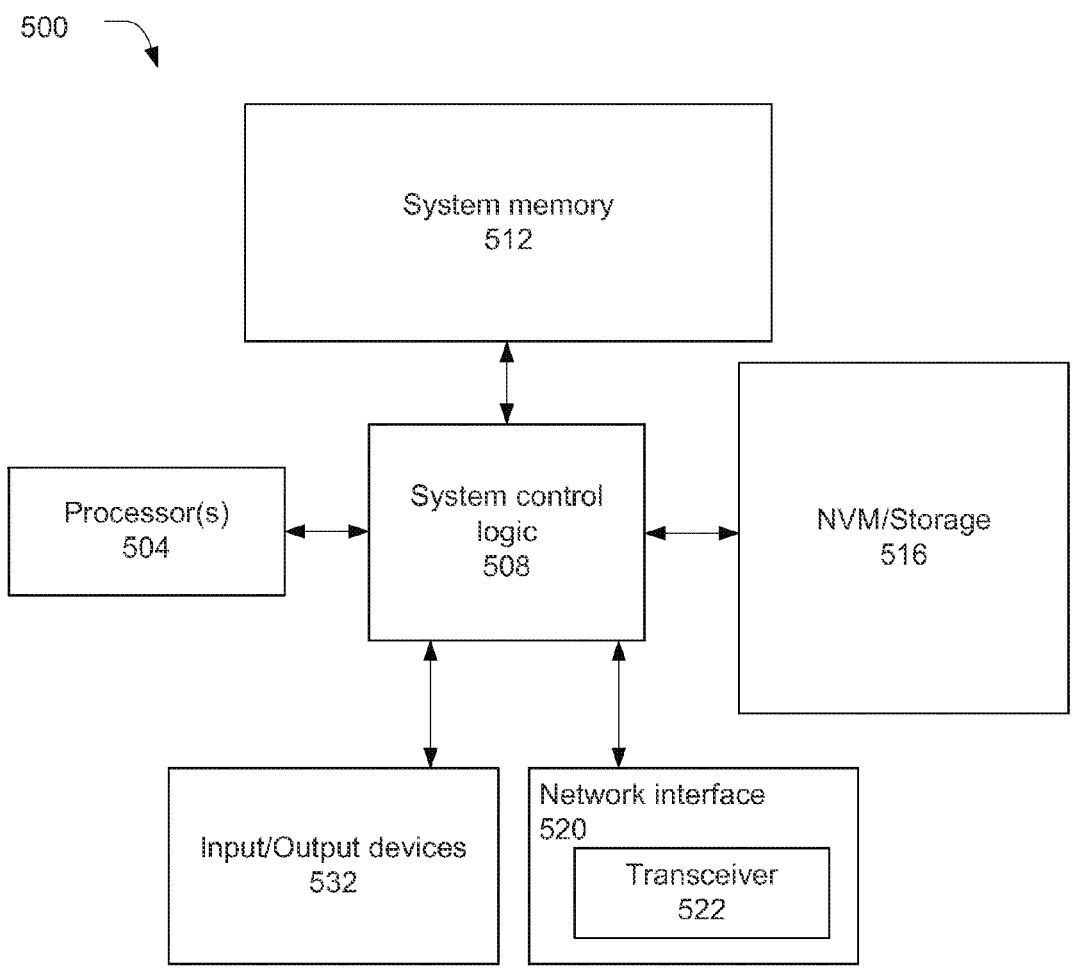
FIG. 5 is a block diagram illustrating an example computing system in accordance with various embodiments.

The proxy terminal 104, UE 108, and/or BMSC 112 described herein may be implemented into a system using any suitable hardware and/or software to configure as desired. FIG. 5 illustrates, for one embodiment, an example system 500 comprising one or more processor(s) 504, system control logic 508 coupled with at least one of the processor(s) 504, system memory 512 coupled with system control logic 508, non-volatile memory (NVM)/storage 516 coupled with system control logic 508, a network interface 520 coupled with system control logic 508, and input/output (I/O) devices 532 coupled with system control logic 508.

The processor(s) 504 may include one or more single-core or multi-core processors. The processor(s) 504 may include any combination of general-purpose processors and dedicated processors (e.g., graphics processors, application processors, baseband processors, etc.).

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, for example, for system 500. System memory 512 for one embodiment may include any suitable volatile memory, such as suitable dynamic random access memory (DRAM), for example.

NVM/storage 516 may include one or more tangible, non-transitory computer-readable media used to store data and/or instructions, for example. NVM/storage 516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the network interface 520 and/or over Input/Output (I/O) devices 532.

Network interface 520 may have a transceiver 522 to provide a radio interface for system 500 to communicate over one or more network(s) and/or with any other suitable device. The transceiver 522 may implement the HTTP access client 120 of UE 108 or the MBMS module and/or HTTP module 132 of proxy terminal 104. In various embodiments, the transceiver 522 may be integrated with other components of system 500. For example, the transceiver 522 may include a processor of the processor(s) 504, memory of the system memory 512, and NVM/Storage of NVM/Storage 516. Network interface 520 may include any suitable hardware and/or firmware. Network interface 520 may include a plurality of antennas to provide a multiple input, multiple output radio interface. Network interface 520 for one embodiment may include, for example, a wired network adapter, a wireless network adapter, a telephone modem, and/or a wireless modem.

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC).

In various embodiments, the I/O devices 532 may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be a mobile computing device such as, but not limited to, a laptop computing device, a tablet computing device, a netbook, a smartphone, etc. In various embodiments, system 500 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method to be performed by a proxy terminal, the method comprising:
   activating multicast broadcast multimedia service (MBMS) with a broadcast multicast service center (BMSC);
   receiving media presentation description (MPD) metadata from the BMSC via user service discovery (USD) signaling, the MPD metadata associated with media data;
   receiving at least a portion of the media data associated with the MPD metadata from the BMSC via an MBMS transmission, the MBMS transmission being a broadcast transmission;
   caching the received media data and metadata;
   receiving a hypertext transfer protocol (HTTP) request from a HTTP access client hosted in a user equipment (UE) to receive at least a portion of the cached media data and metadata; and
   transmitting, in response to the HTTP request, the at least a portion of the cached media data and metadata to the UE via unicast HTTP signaling.

2. The method of claim 1, wherein the media data and MPD metadata is in a dynamic adaptive streaming over HTTP (DASH) format.

3. The method of claim 1, wherein the received MPD metadata is a first MPD metadata, and wherein the method further comprises transmitting, to the UE, a second MPD metadata associated with a subset or superset of the media data that is available for HTTP transmission to the UE.

4. The method of claim 1, wherein the caching includes storing the received media data and MPD metadata for later transmission via the HTTP transmission, and wherein the HTTP request is received from the UE after caching the received media data and metadata.

5. The method of claim 1, wherein the proxy terminal is included in an evolved Node B (eNB) or another UE.

6. An apparatus comprising:
   a multimedia broadcast and multicast service (MBMS) access client configured to:
      receive an MBMS transmission including media data and metadata, wherein the MBMS transmission is a broadcast transmission; and
      cache the media data and metadata for later transmission; and
   a hypertext transfer protocol (HTTP) server module configured to:
      receive an HTTP request from an HTTP access client of a user equipment (UE) after the media data and metadata is cached; and
      transmit at least a portion of the media data and metadata to the HTTP access client of the UE via an HTTP transmission, wherein the HTTP transmission is a unicast transmission.

7. The apparatus of claim 6, wherein the media data and metadata is in a dynamic adaptive streaming over HTTP (DASH) format.

8. The apparatus of claim 6, wherein the apparatus is an evolved Node B (eNB) configured to communicate with the UE over a wireless communication network.

9. The apparatus of claim 6, wherein the apparatus is another UE.

10. The apparatus of claim 6, wherein the apparatus is included in the same UE that contains the HTTP access client.

11. The apparatus of claim 6, further comprising memory configured to store the cached media data and metadata for later transmission via the HTTP transmission.

12. The apparatus of claim 6, wherein the MBMS transmission is received from a broadcast multicast service center (BMSC).

13. The apparatus of claim 6, wherein the MBMS access client is configured to decode an application layer forward error correction (AL-FEC) code associated with the MBMS transmission.

14. The apparatus of claim 13, wherein the MBMS access client is further configured to perform one or more recovery procedures to retrieve incorrectly received portions of the media data or metadata.

15. The apparatus of claim 6, wherein the MBMS access client is configured to receive the MBMS transmission via a file delivery over unidirectional transport (FLUTE) protocol.

16. The apparatus of claim 6, wherein the MBMS access client is configured to receive the MBMS transmission via an internet protocol (IP) multicast protocol.

17. The apparatus of claim 7, wherein the MBMS access client is configured to receive a first media presentation description (MPD) metadata associated with the media data, and wherein the HTTP server module is further configured to generate and transmit a second MPD metadata to the UE, the second MPD associated with a subset or superset of the media data that is available for HTTP transmission to the HTTP access client of the UE.

18. The apparatus of claim 7, wherein the HTTP server module is configured to receive an HTTP request from the HTTP access client identifying a segment of the DASH format media data to be transmitted to the HTTP access client.

19. The apparatus of claim 12, wherein the MBMS access client is further configured to send a report to the BMSC with delivery verification information or reception statistics.

20. One or more non-transitory computer-readable media having instructions, stored thereon, that, when executed cause a wireless communications device to:
   receive an MBMS transmission including media data and metadata in a dynamic adaptive streaming over hyper text transfer protocol (DASH) format, the media data including a plurality of media segments, and the MBMS transmission being a broadcast transmission;
   store some or all of the media segments for later transmission; and
   transmit one or more of the stored media segments to a user equipment (UE) via hyper text transfer protocol (HTTP) using unicast HTTP signaling.

21. The one or more computer-readable media of claim 20, wherein the instructions, when executed, further cause the wireless communications device to:
   receive a first media presentation description (MPD) metadata associated with the plurality of media segments; and
   transmit a second MPD metadata to the UE, the second MPD associated with a subset or superset of the plurality of media data segments that are available for transmission to the UE.

22. The one or more computer-readable media of claim 20, wherein the instructions, when executed, further cause the wireless communications device to:
   receive a request from the UE for transmission of one or more of the media segments; and
   transmit the one or more media segments from the UE in response to the request.

23. The one or more computer-readable media of claim 20, wherein the wireless communications device is an evolved Node B (eNB) configured to communicate with the UE over a wireless communication network.

24. The one or more computer-readable media of claim 20, wherein the wireless communications device is another UE.

25. An apparatus comprising:
a memory;
a multimedia broadcast and multicast service (MBMS) access client of a user equipment (UE) configured to:
receive an MBMS transmission including media data and metadata in a dynamic adaptive streaming over hypertext transfer protocol (DASH) format, the media data including one or more media segments, and the MBMS transmission being a broadcast transmission; and
cache the media data and metadata in the memory for later access; and
a DASH client of the UE configured to retrieve, after the media data is cached, one or more of the media segments or metadata from the memory using unicast signaling.

26. The apparatus of claim 25, wherein the DASH client is configured to retrieve the one or more media segments or metadata using an HTTP request.

27. The apparatus of claim 25, wherein the MBMS access client is configured to receive the MBMS transmission via a file delivery over unidirectional transport (FLUTE) protocol.

28. The apparatus of claim 25, wherein the MBMS access client is configured to receive media data and metadata from a remote server, wherein the MBMS access client is configured to receive a subset of the media segments available from the remote server that are associated with a media presentation.

29. The apparatus of claim 25, wherein the MBMS access client is configured to receive a subset of the media segments associated with a media presentation, wherein the subset of media segments corresponds to a beginning portion of the media presentation, and wherein the DASH client is configured to adaptively retrieve media segments corresponding to at least some of a remaining portion of the media presentation during playback of the media presentation.

30. The apparatus of claim 25, wherein the MBMS access client is configured to receive media data associated with a media presentation based on a user indication that identifies the media presentation, wherein the user indication is received prior to availability of the media presentation.

* * * * *